United States Patent [19]
Griffeth

[11] Patent Number: 5,822,919
[45] Date of Patent: Oct. 20, 1998

[54] NATURAL VEGETATION RESERVOIR FEEDING SYSTEM FOR WILDLIFE

[76] Inventor: Jeffrey D. Griffeth, P.O. Box 320, S. Wirick St., Star City, Ind. 46985

[21] Appl. No.: 783,125

[22] Filed: Jan. 14, 1997

[51] Int. Cl.⁶ .......................... A01G 29/00; A01G 25/00
[52] U.S. Cl. ................... 47/48.5; 47/65.5; 47/80
[58] Field of Search .............. 435/410; 47/48.5, 47/65.5, 80

Primary Examiner—Leon B. Lankford, Jr.

[57] ABSTRACT

This invention relates to a method for growing high protein natural vegetation on a reservoir system using only a a small section of land comprising of a trench of precalculated size dug in a suitable site close to wildlife; predetermined layers of lime, pine bark, polymer, fertilizer, bacteria, and soil; a water and water soluble fertilizer delivery system consisting of a netted polystyrene aggregate, sheet of kraft paper, and inserted rigid pipe with openings at either end; and natural vegetation either potted or transplanted from the wild; whereby the natural vegetation reservoir system allows for regular irrigation and fertilization of said vegetation growing on said trench, thereby allowing said vegetation to uptake said fertilizer and be ingested by said wildlife.

7 Claims, 10 Drawing Sheets

NATURAL VEGETATION RESERVOIR FEEDING SYSTEM FOR WILDLIFE

BACKGROUND

1. Field of Invention

This invention relates to feeding systems for deer and other wildlife, specifically to such systems and products which use natural vegetation, such as honeysuckle as its food source.

2. Description of Prior Art

Hunting clubs, landowners, deer hunters, deer and elk ranchers, and wildlife enthusiasts have only had a few choices in the past for supplemental feeding of their wildlife. One was pelletized feed, blended to include high levels of protein and other nutrients. This is an option that is beneficial to the wildlife; however, it is very costly on a large scale. Another option is to feed corn or whole soybeans. The problem with this alternative is that a balanced diet is not being satisfied.

The only other option is to plant food plots, which may consist of clover, kudzu, cow peas, soybeans, rye grass or a variety of other plants. One problem with these food plots, especially in the southern United States, is that the extremely hot summers are not conducive to growing some of these crops. Wildlife managers have planted rye grass plots in the fall to attract the deer. These plots have no beneficial nutritional value and are only available in the fall.

The major problem with these food plots is that they provide food either in the fall, after the antlers are developed, or they provide a decent protein source in the spring, as the antlers are beginning to develop. They do nothing for the deer nor his antlers during the summer months, the time when the antlers are developing and growing. During the summer, the plots are high in fiber and low in protein. All the juicy, desirable new growth is non-existent.

Managers feed their deer with one main purpose: to grow big bodies and big antlers. The bigger the antlers and bodies of the male deer, the more valuable this deer becomes as a huntable trophy. Hunting clubs, and landowners that lease land to hunting clubs, equate the value of the lease or value of the membership in the club to the value of the trophies living there.

There is an increasing awareness for proper deer and wildlife nutrition. Hunting is becoming more of a commercialized business in many parts of the country. Many urban dwellers are interested in hunting and are willing to pay large sums of money to harvest a trophy animal. Therefore, feeding a proper diet and doing whatever is possible to grow a trophy animal, is becoming a very important goal of many individuals and clubs.

Pelletized feeds, grains, and planted food plots are all quite expensive, considering the number of deer and other wildlife species that will feed on these sources. Planted food plots also require machinery to clear and till the ground, fertilize and lime, plant, and mow if necessary. They are also only good for one to four years, depending on the crop. This means that reseeding is necessary either every year or every few years.

One problem that can develop in deer herds feeding on planted food plots is a hoof and mouth disease. This disease can develop because of feeding and defecating in the same spots. Deer are naturally browsers, which means that they normally feed on the tops of plants, ends of vines, and other juicy plant shoots. They browse these plants and keep moving and feeding. In contrast, planted food plots bring many deer to a very small area. In places where there is a shortage of natural vegetation and overfeeding, deer will congregate in the these food plots, which are the only food sources available. Once a hoof and mouth disease is contracted it will spread very quickly throughout the herd. A very large portion of the deer herd in south-central Alabama was killed off many years ago, and an outbreak has been found in north-eastern Michigan 1997. Both of these examples were linked to planted food plots and the congregation of deer herd in them.

Another disadvantage to planted food plots is in order to perform at their best, they need water and fertilizer. The plots can be irrigated and fertilized; however, this can be very costly if the plots are very large. And, of course, regular and adequate rainfall cannot be depended upon. Even if the plots receive plenty of water and fertilizer, it does not necessarily mean that the nutrients will be released from the soil to the plant. Cation exchange capacity of the soil, or the ability to release nutrients, is affected by the amount of organic material and the pH of the soil. The soil pH may need corrected with limestone (CaO) and/or may need micronutrients in order to produce the best possible forage.

OBJECTS AND ADVANTAGES

Therefore, there is a need in the marketplace for a feeding system, that is 1) inexpensive, 2) simple, 3) easy to maintain, 4) long-term, 5) deer will find palatable, 6) attract deer, 7) provides a nutritious, high protein food source and spring-like growth during the antler-growing season (summer), and 8) provides water for the plants and corrects the soil problems, such as cation exchange capacity and pH, in order to produce the best possible vegetation for the deer. This present invention addresses and supports each of these requirements:

1) Compared to the other available options, this invention is less expensive over the long term. Installation is only required one time. Maintenance is very inexpensive.

2) This invention is simple to install, and extremely simple to maintain once installed. All that is required is a shovel.

3) A nearby water source, a container, such as a 55-gallon drum, and common garden hose are all that are needed for maintaining the system. Maintenance is only required three times per year normally and only takes approximately 15–20 minutes per system.

4) This system, once installed, will last indefinitely.

5) Many studies at Auburn University have shown that deer prefer natural vegetation to planted food plots. This system uses natural food sources for the deer, such as honeysuckle, wild grape, green briars, berry briars, etc.

6) The high protein natural vegetation is sensed by the deer and will attract them to the system. They prefer natural vegetation to planted food plots or grains, therefore spending more time at the system once there.

7) This system will provide a high protein food source during the most crucial time, when the antlers are growing. It will provide spring-like growth all summer long when the bucks antlers are developing and the does are producing milk for newborn fawns.

8) This system "fixes" the soil problems by being irrigated under ground, which allows the soil to hold the water better than above ground irrigation. This also forces the roots of the plants to grow deeper into the soil, which gives them added protection during a severe hot, drought. It also adds organic material and lime to correct for acidity and increase the cation exchange capacity.

DRAWING FIGURES

REFERENCE NUMERALS IN DRAWINGS

Figure 1:
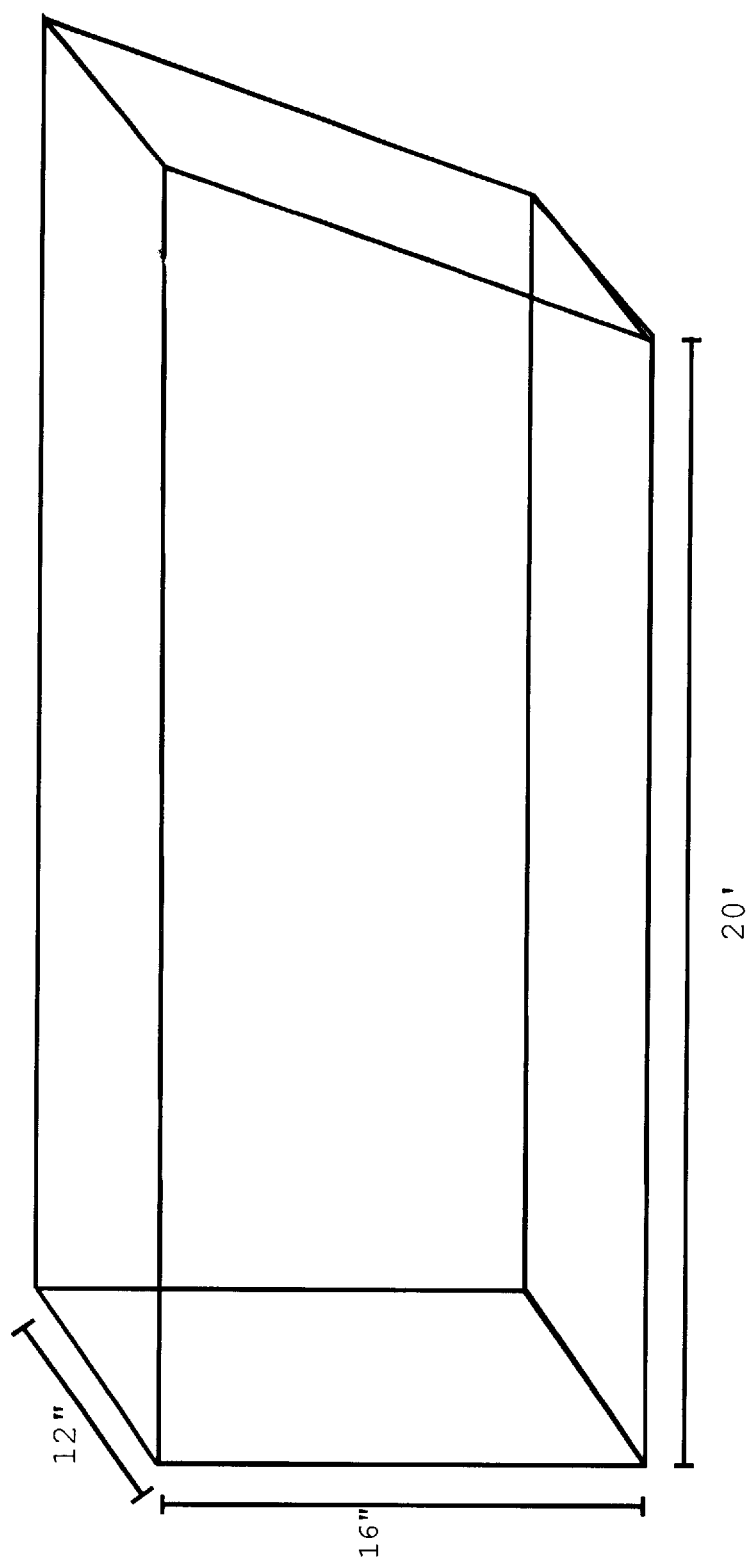
FIG. 1 shows a 20' long×12" wide×16" deep trench dug into of the ground, angled out on one end.
Figure 2:
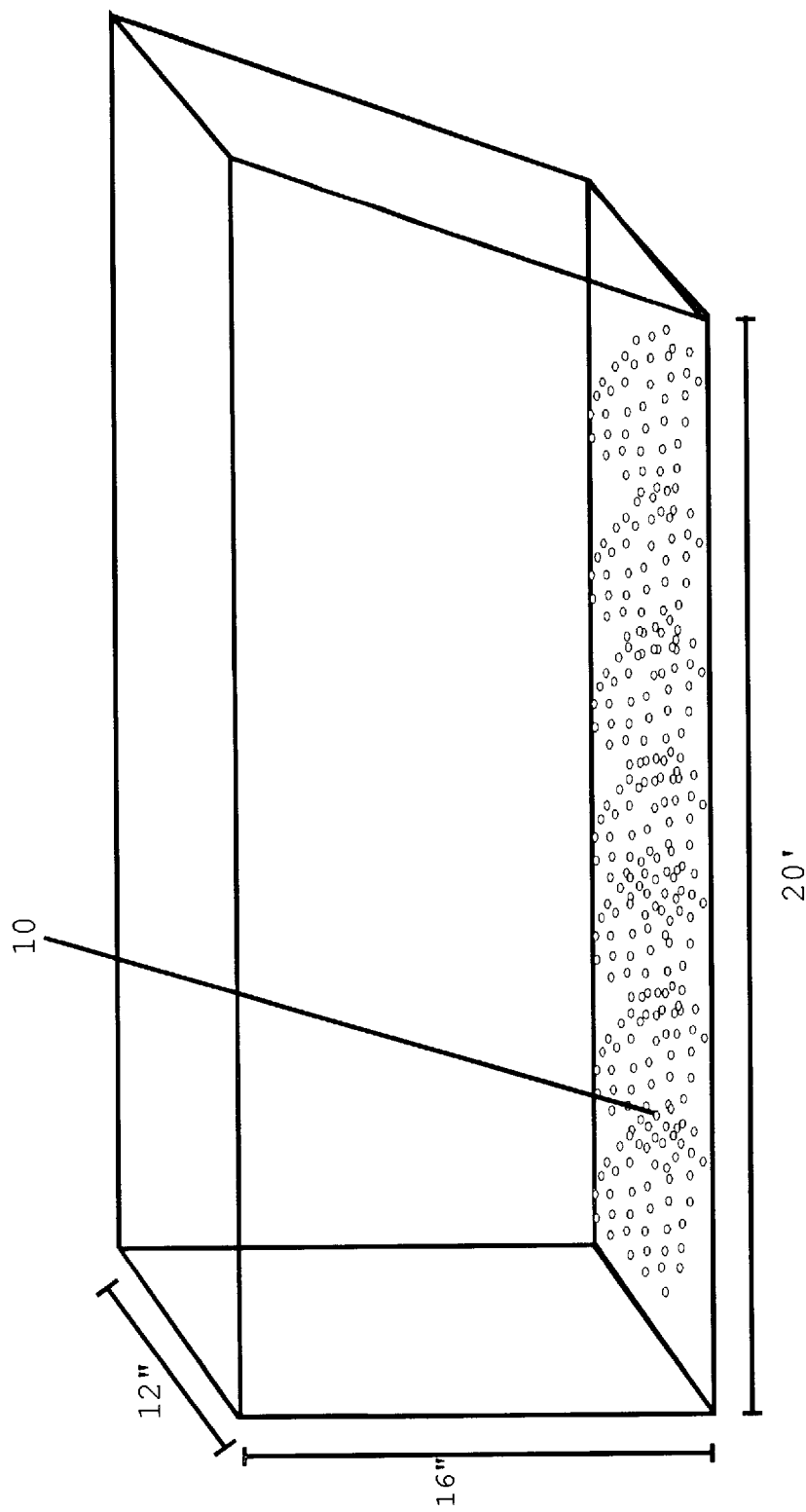
FIG. 2 shows a layer of limestone spread across the bottom of the trench.
Figure 3:
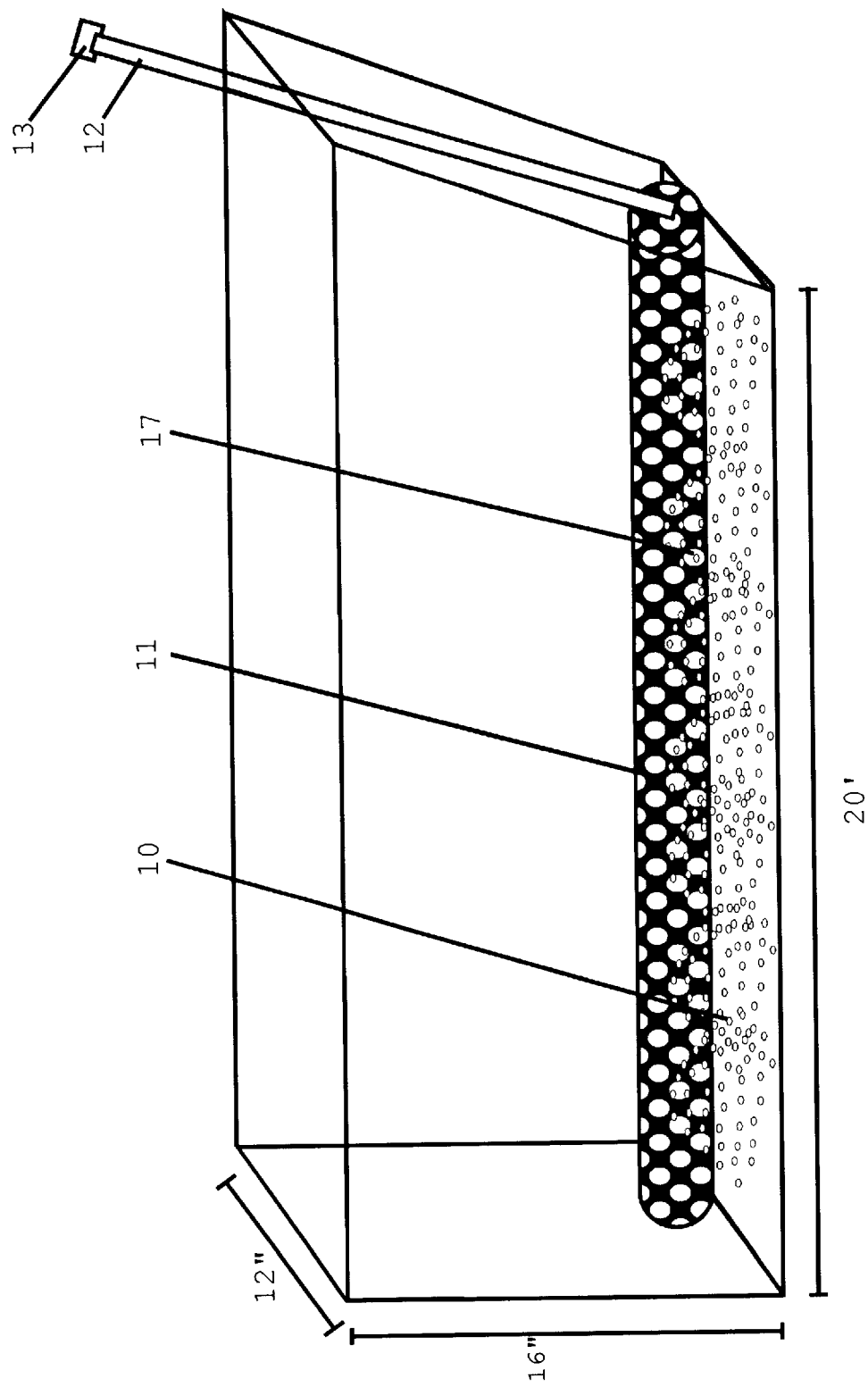
FIG. 3 shows a section of polystyrene aggregate in netting placed in the center of the trench with a length of PVC pipe, with end cap on the upper end, inserted into the center of one end of it. Polymer is also shown sprinkled in and on the aggregate.
Figure 4:
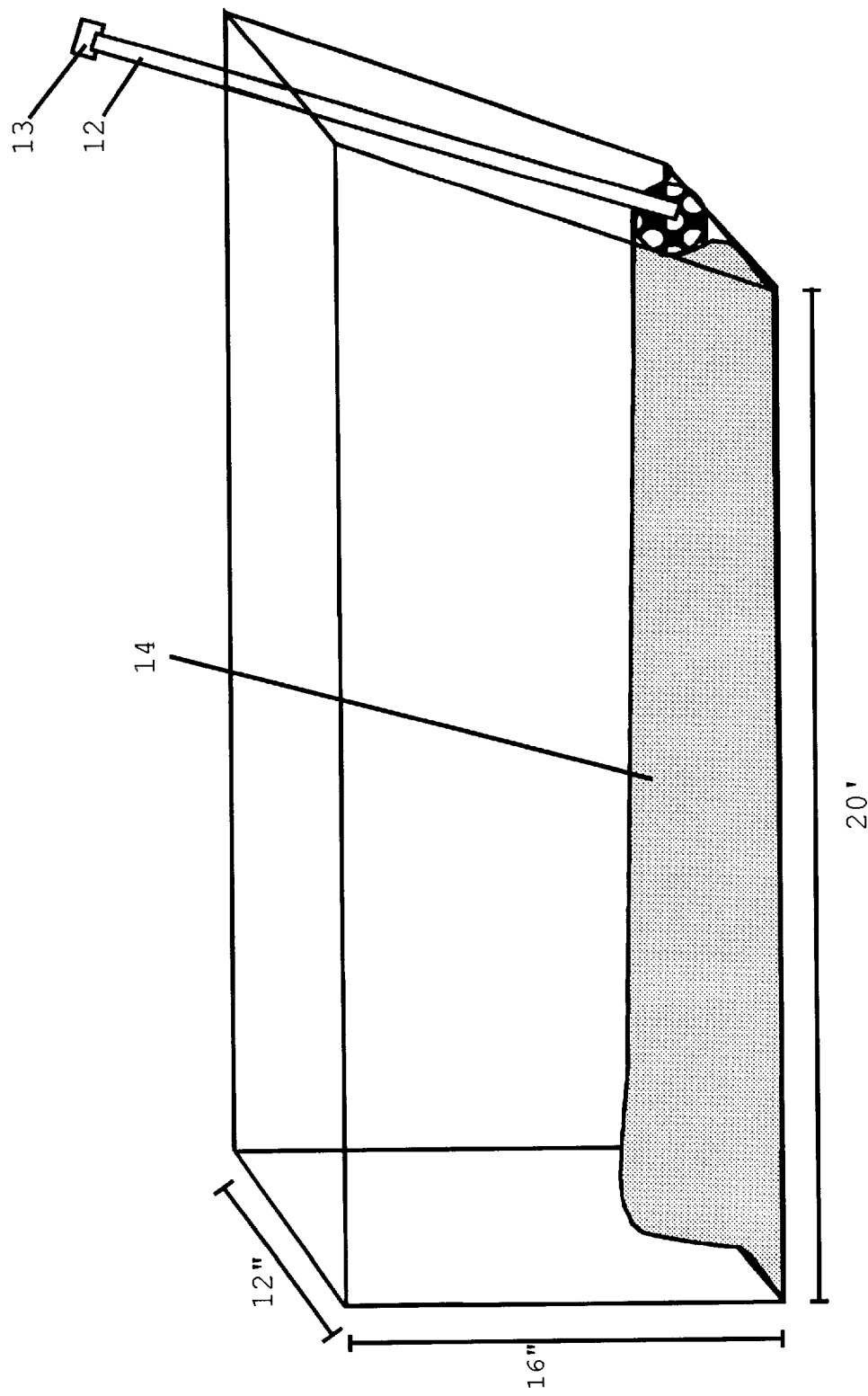
FIG. 4 shows a 20' section of Kraft paper draping over the polystyrene.
Figure 5:
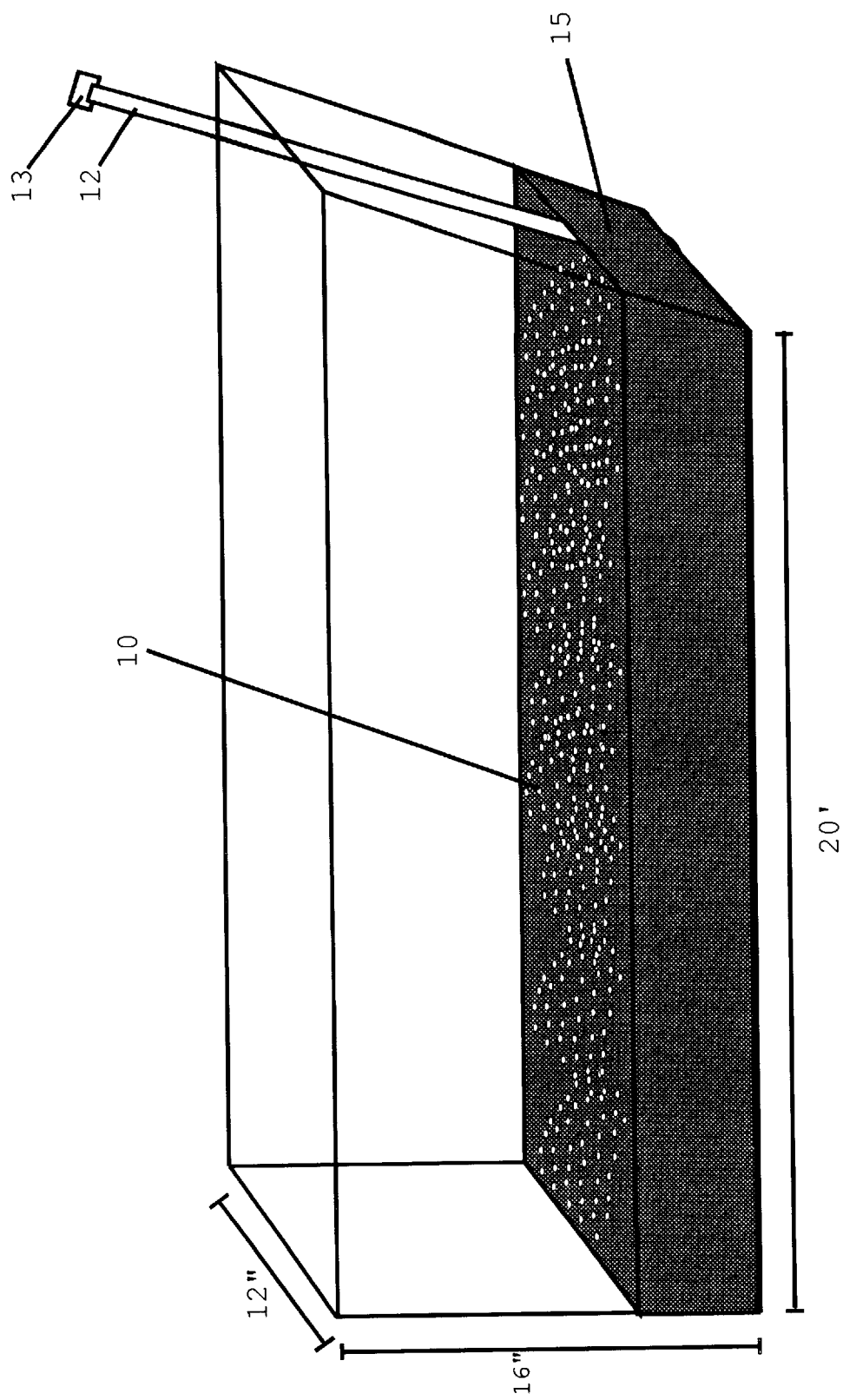
FIG. 5 shows the trench with a layer of soil placed around and covering the polystyrene; and limestone sprinkled across the soil.

10 Limestone (CaO)
11 Polystyrene Aggregate in Netting
12 PVC pipe
13 PVC cap
14 Kraft paper
15 Soil
16 Pine bark
17 Polymer
18 Super Juice® 20-10-20 water soluble fertilizer
20 Bacterial inoculant
21 Super Lime® High Calcium lime
22 Honeysuckle plant
23 55-gallon drum
24 Rubber garden hose

DESCRIPTION

FIGS. 1 to 10

After choosing an appropriate site, a 20 feet long trench is dug, using a trencher or shovel, as illustrated in FIG. 1 about 12 inches wide and 16 inches deep. It needs to be fairly level from beginning to end. This will allow the water to flow evenly later. The dirt that has been taken out of the hole is laid right along the side of the hole to ease refilling. On one end of the trench dig an additional one to two feet out while sloping it down into the trench as shown in FIG. 1.

When the trench is dug, 4 cups of limestone 10 (Calcium Oxide) are sprinkled evenly across the bottom of the trench. Limestone will correct for the acidity of the fertilizer, the pine bark, and the natural soil. A 24" section of ½" PVC pipe is used for the stand pipe which will be used for rehydrating and refertilizing the system. One end of the ½" PVC stand pipe 12 is inserted into the polystyrene aggregate 11, at an angle similar to the sloping end of the trench. One of the sections of netting may have to be cut in order to get the pipe inserted. Care must be taken not to plug the end of the pipe with the styrofoam. A ½" PVC cap 13 is then put on the upper end. The cap must not be put on too tightly or it may never come off. This cap will help keep bugs out and keep the system from drying out. The polystyrene aggregate 11 (patent pending) is obtained from EEE ZZZ Lay Drain Company, Pisgah Forest, N.C. It is comprised of approximately 2" cubes of polystyrene styrofoam bundled into a ¾" netting that has a 6" diameter. The 10' long netting once filled with polystyrene is then tied off on either end with some type of appropriate closure.

Next two 10' sections of polystyrene aggregate 11 are laid into the trench end to end lengthwise with the inserted upright pipe at one end of the trench. Next, 1 lb. of polymer 17 is sprinkled on top of the aggregate. Most any copolymer will work as long as it will absorb approximately 175–200 times its own weight in water. Adjustments in application rates are needed to achieve this absorption. One supplier of a polymer is Aquatrols, Pennsauken, N.J. They manufacture a copolymer acrylamide acrylate called Super Sorb®. Next, a strip of kraft paper sheeting 14 is laid over top of the polystyrene aggregate. The paper is to protect the polystyrene aggregate somewhat until the system gets settled. The kraft paper needs to be at least 40 lb. paper and should be 20' long and at least 12" wide.

Figure 6:
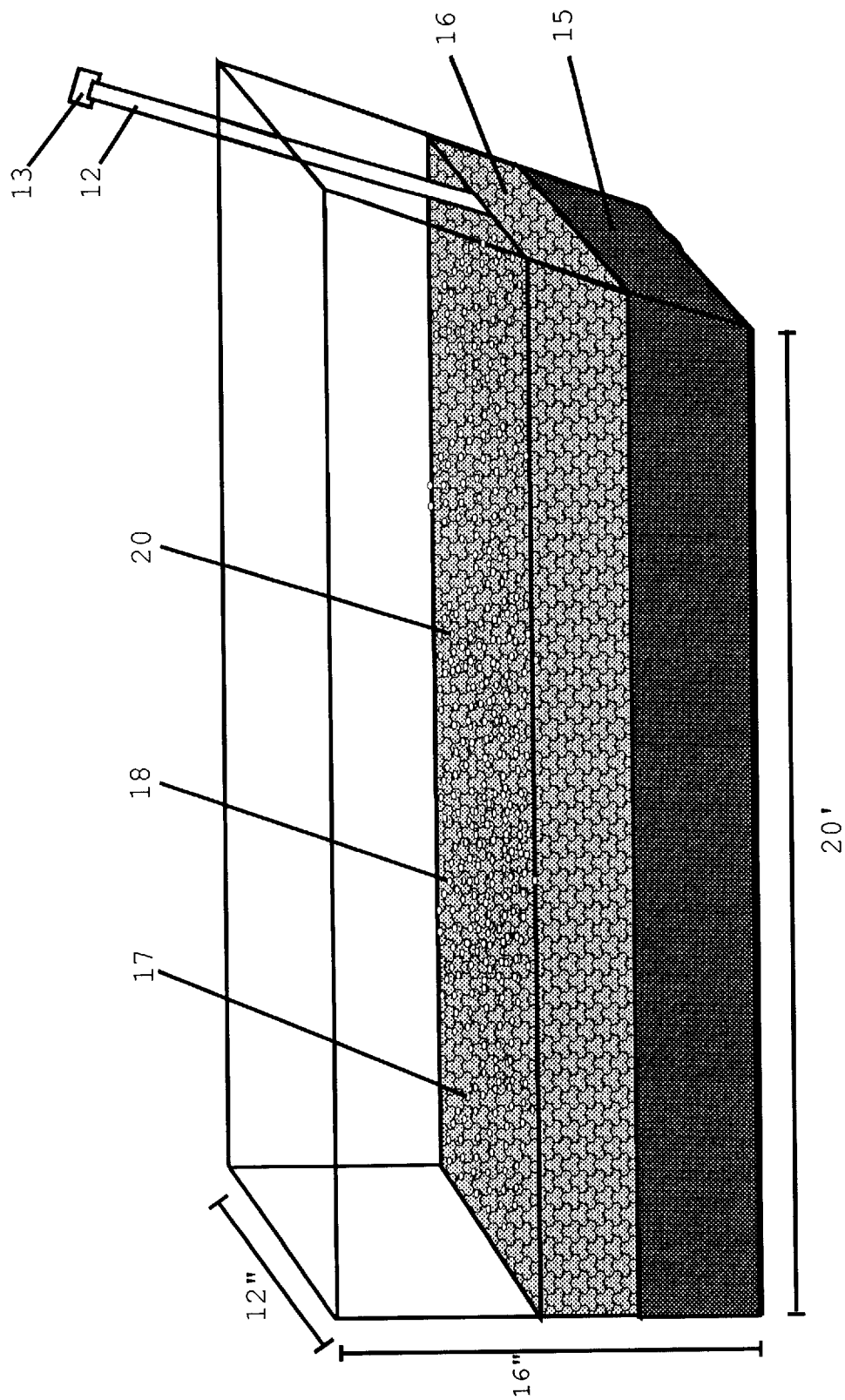
FIG. 6 shows the trench with a layer with the first layer of pine bark, bacterial inoculant, Super Juice™ water soluble fertilizer, and polymer.
Figure 7:
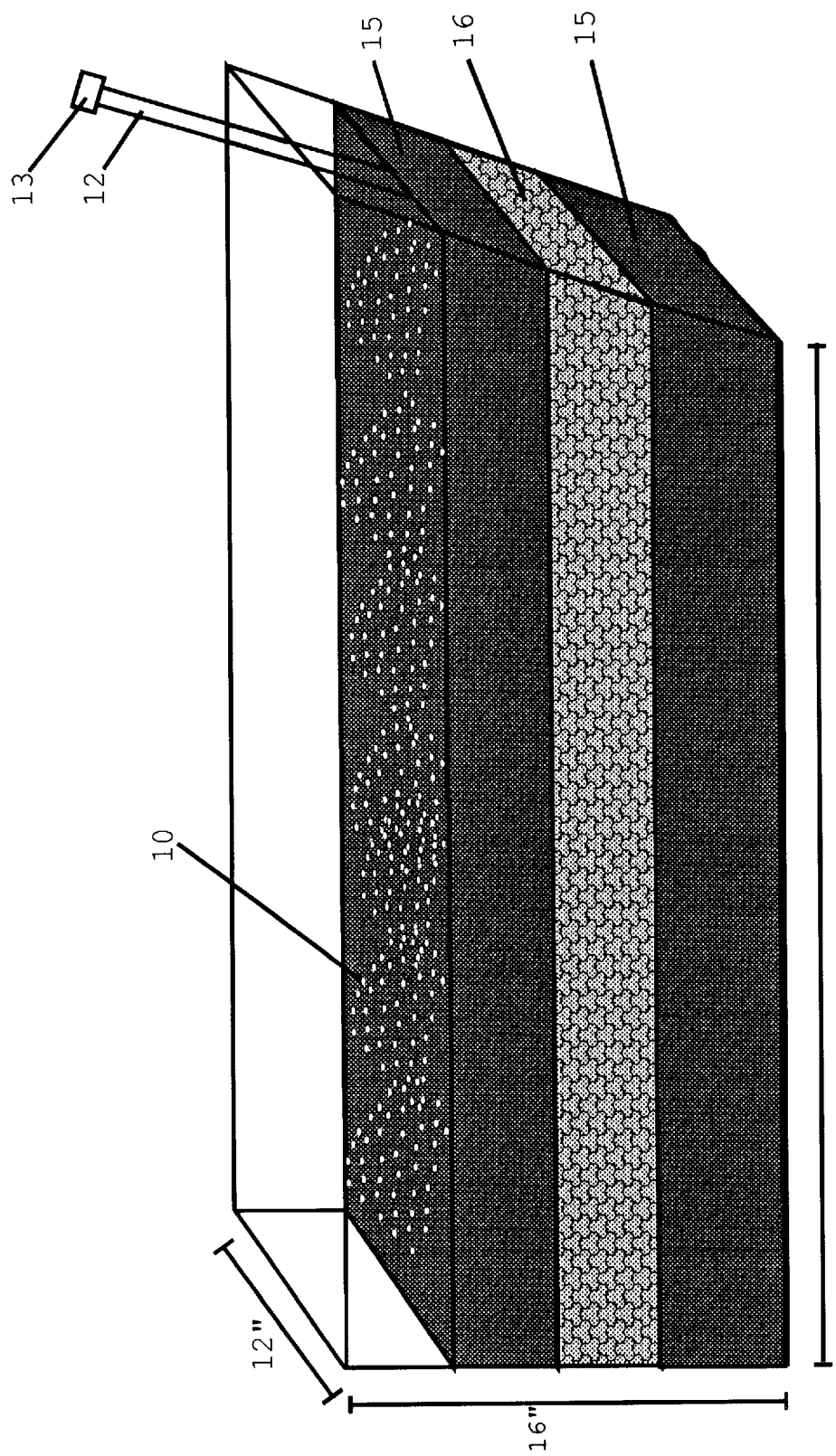
FIG. 7 shows the second layer of soil and limestone sprinkled across it.
Figure 8:
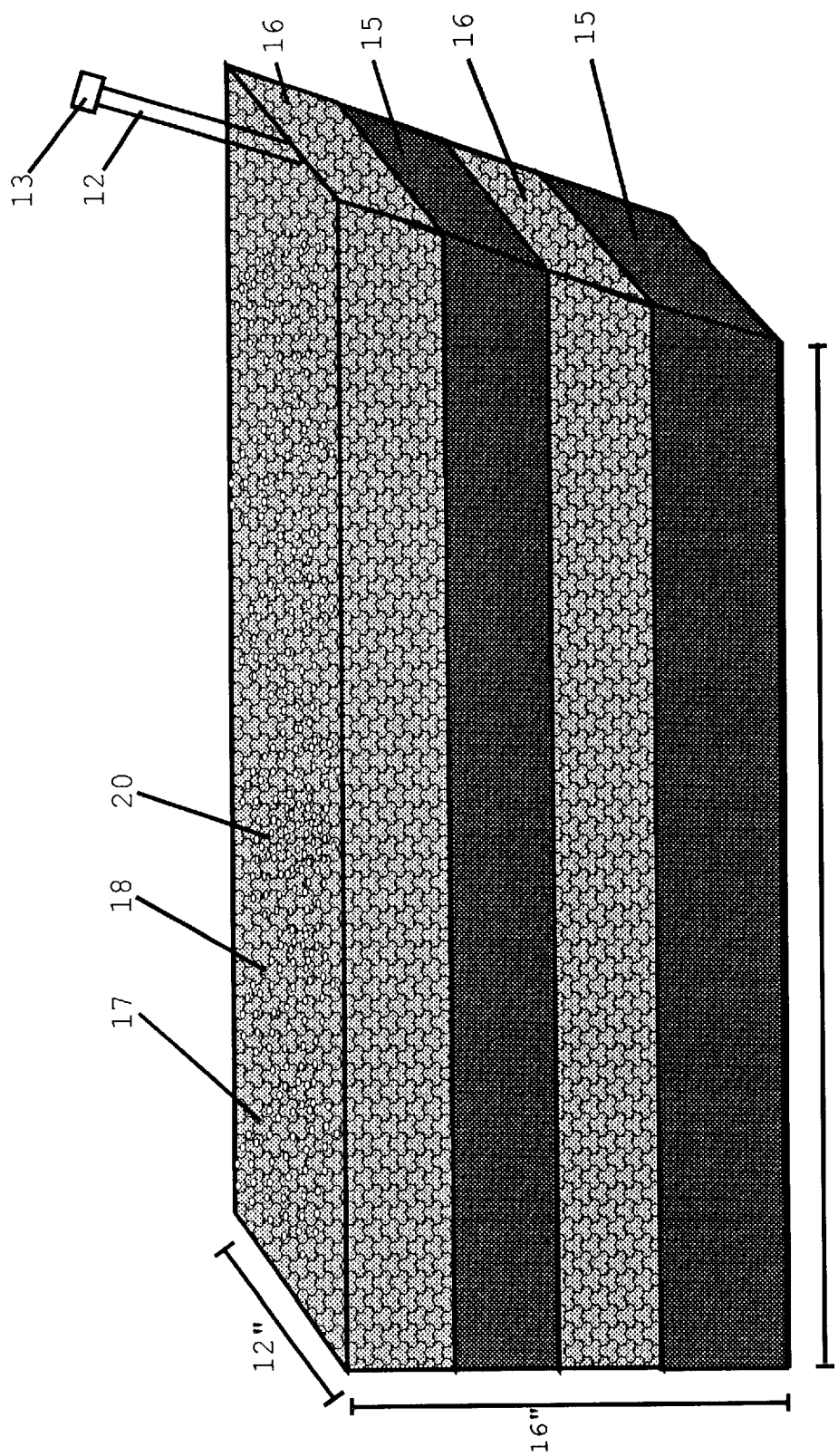
FIG. 8 shows the second and final layer of pine bark, bacterial inoculant, Super Juice™ water soluble fertilizer, and polymer.

Next soil 15 that was previously taken out of the trench is filled in around the sides of the polystyrene aggregate. The soil is added until there is 3" of soil above the polystyrene aggregate. The soil also needs to be spread evenly on top. Again, 4 cups of limestone 10 are spread evenly across the previous layer of soil. The next layer as shown in FIG. 6 is comprised of 3 cu. ft. of pine bark 16 spread evenly. This should be pine bark that contains no "white wood" or inner wood from the tree. Only the outer bark should be used. Bagged pine nuggets that are 2–3" in size work well. White wood should be avoided because of the additional heat that it will produce in the trench under pressure, as composting begins. Pure pine bark will compost at a cooler temperature and break down more slowly. The bark layer is added to this invention for holding water and providing an organic mixture that is beneficial to the plants.

Very carefully sprinkle 1 lb. (2–8-oz. cups) of the Super Juice™ 20-10-20 water soluble fertilizer 18 across the top of the pine bark. Also spread ½ lb. of polymer 17 and a 4 grams of the bacterial inoculant 20 evenly over the pine bark. This bacterial inoculant is clover and alfalfa seed inoculant available from any seed distributor. The inoculant is comprised of physcrophyl bacteria which aid in the breakdown of organic materials, i.e. pine bark. Most southern United States soils are very acidic and have little to no bacteria for breaking organic materials down. These bacteria cannot live in extremely acid soils.

Add another 2-inch layer of soil 15. Add another 4 cups of limestone evenly, then another 3 cu. ft. of pine bark. Sprinkle in another 1 lb. (2–8-oz. cups) of Super Juice™ 20-10-20 water soluble fertilizer 18, ½ lb. of polymer 17 and 8 grams of bacterial inoculant 20.

Fill the rest of the hole with soil 15. Heap the soil on the trench. As time goes on, the ingredients and soil in the system will settle. Spread 1 lb. of Super Lime™ high calcium lime 21, obtained as the dried by-product of an acetylene factory, across the top of the system and rake it in lightly with your shovel or rake. This liming agent reacts very quickly in the soil and begins to correct the soil pH before normal limestone.

A variety of plants may be used; however, I recommend a vining honeysuckle 22. This honeysuckle is available from most nursery operations, especially in the southern United States. Excess foliage should be removed from the plants before transplanting. Small plants in 2" pots work better than large, mature plants, because of transplant shock.

Figure 9:
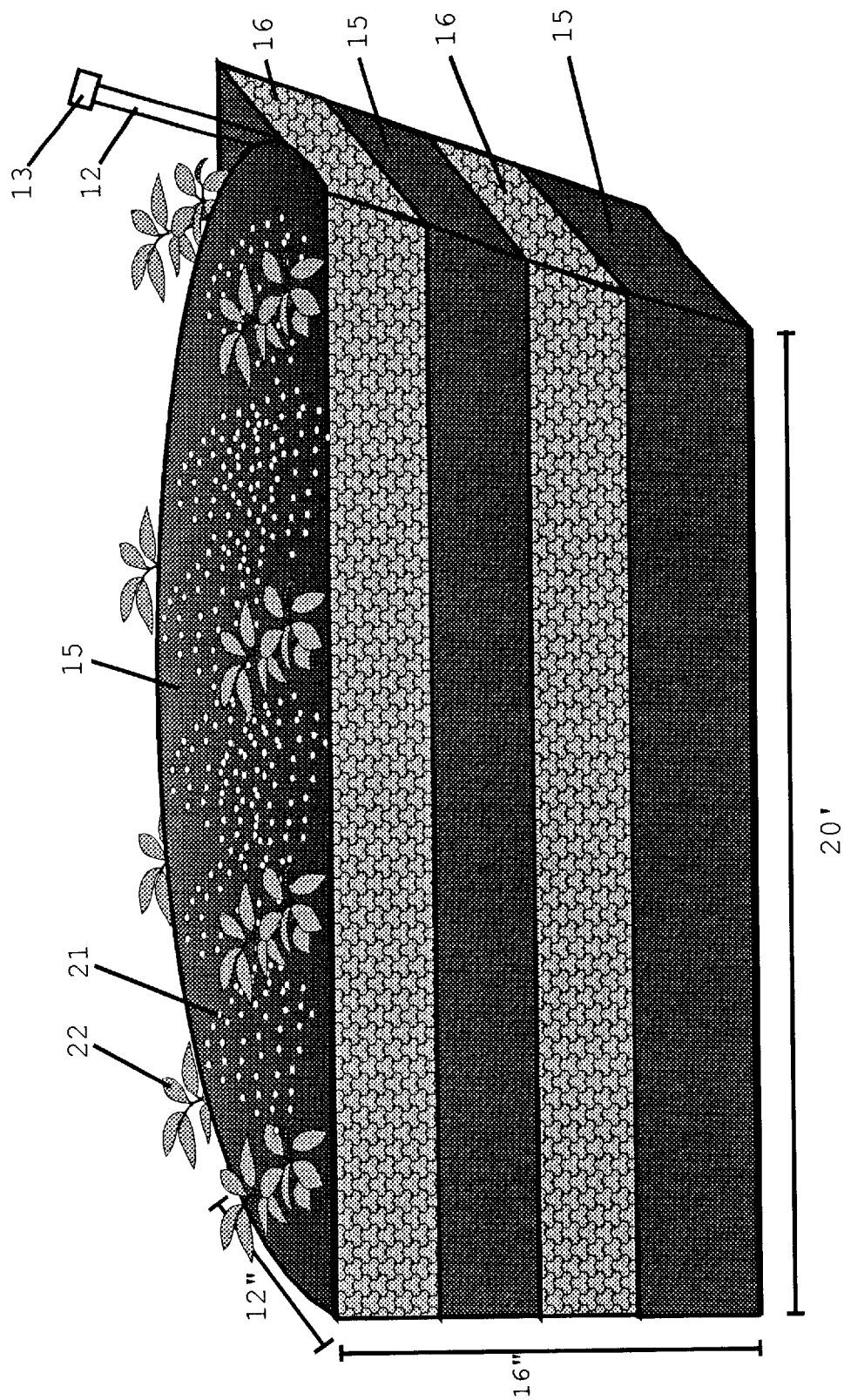
FIG. 9 shows the remaining soil filling the trench and mounded on top to allow for settling. Also shown is Super Lime™ sprinkled across the top of the mounded soil, and plants planted in a typical arrangement.

Plants should be planted around the outer edges of the system, as illustrated in FIG. 9. Dig a small hole with your hand, remove the plant from the pot and place it in the hole. Pack soil around the pot and put a very thin layer on top of the pot to keep it from drying out. Treat these plants as you would tomato plants in a garden. It is a very good idea to give each plant plenty of water to allow the soil to seal in around the pot and wet the roots thoroughly. You can mix 1 tablespoon of Super Juice™ with one gallon of water or simply use plain water for this operation.

Remember that deer need and seek out a variety of vegetation. The more variety of plants you add, the better it will attract deer and the more nutrients you will be getting into the animals. The honeysuckle plants will be fine if that is all you want to use. There will most likely be natural briars and weeds grow on the system.

Because we use young plants on the reservoir system, the deer will be able to completely devour these small nutritious plants. Because of this, the system should be protected from the deer until it gets completely established. This can be accomplished by constructing a fence around it. Whatever you decide, you will need to protect it for at least the first year. Rabbits, raccoons, wild hogs, and other varmints may also give you problems. It seems that most animals can smell these nutritious plants.

OPERATION

Before installation is to begin, a site must be selected. Selection of a site to construct the reservoir system involves some important considerations. To start, it should be in a location where deer travel and spend time feeding. It can be close to a hunting stand. Consideration must also be given to how much sun will reach the system. Better success will be achieved if a location is chosen that is along the edge of the woods or in a small clearing. I advise not putting it in the middle of a large clearing or pasture, if you want to hunt near it. Deer will feed on it; however, they will be feeding in the dark. A big buck is not likely to spend much time in the open during daylight.

It will produce very quick results if it is installed with an existing stand of some type of natural deer vegetation at the end of the system. This will allow a very quick response to what you have done. It will start attracting deer within two weeks and will give you a mature plant that will better hold up to the heavy deer browsing. Grape vines work quite well for this. Once you have installed your system, just pull the vine down out of the tree and lay it across the system. You can use mature green briar, mature honeysuckle plants or other types of briars. Because of maintenance, you will either need easy access or a nearby water source (pond, creek, etc.).

Figure 10:
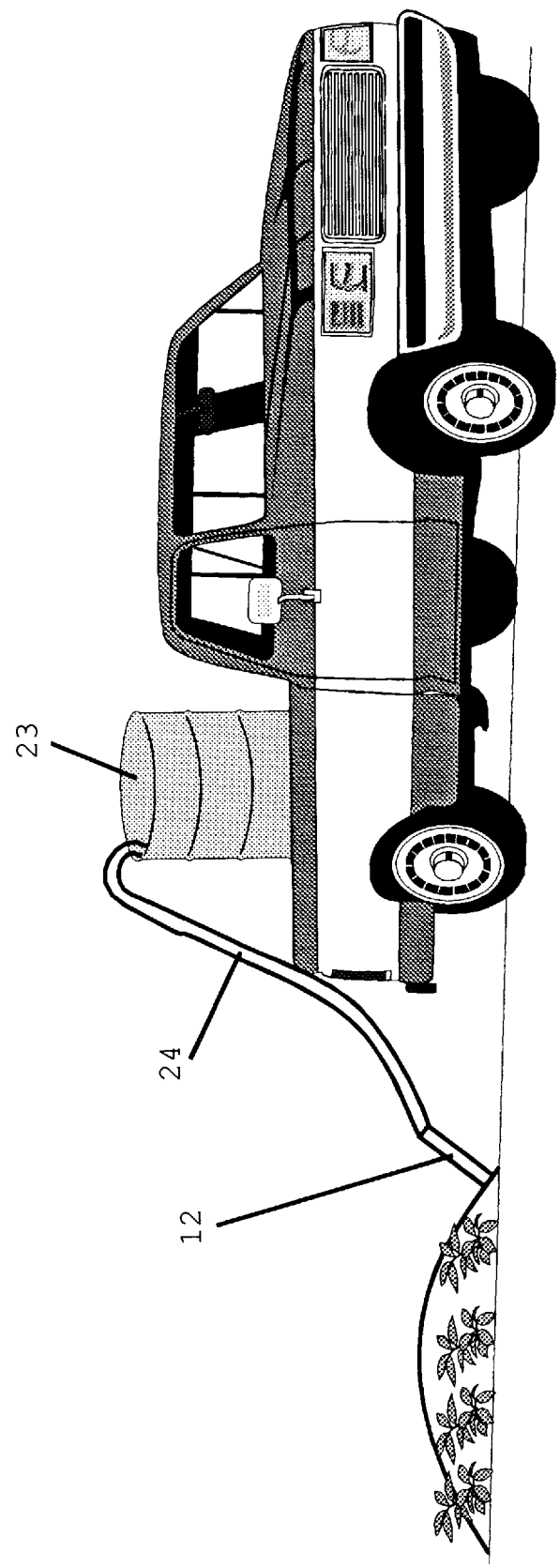
FIG. 10 shows maintenance of the system (fertilizing and irrigating).

Once installed and operational, maintaining the system is quite simple. You will need to "juice" the system about every 60 days during the spring and summer (depending on the amount of rainfall you receive). Add two pounds of Super Juice™ granules (4–8 oz. cups) to a 55-gallon drum 23 and fill with water. Using a rubber garden hose 24, you can syphon the water right into the trench as shown in FIG. 10.

Carefully remove the cap 13 from the upright pipe 12. Insert the garden hose all the way down into the 55-gallon drum; wait a few seconds for it to fill with water; hold your thumb over the end of the hose; pull the hose out until you are below the bottom of the drum and release your thumb. You will have it flowing. Put the end of the hose over the pipe. Don't worry if it leaks. The important thing is that you are filling the trench. It should only take 15 minutes to empty the 55 gallons. Refill the drum with water and continue adding water until it won't take anymore and runs out the top of the system. Most systems will take 100–200 gallons per 20' system per "juicing." (Note: You can use any size tank you want. I use a 55 gallon drum as a standard example).

If the system is installed in a very dry area or you experience a drought, you should "Juice" your system every month with a "half-rate" of Super Juice™. Add one-pound (2–8 oz. cups) of Super Juice™ to 55 gallons of water. If access is limited, you can carry water from a nearby source using a bucket. Pour 55 gallons of water into the pipe using a funnel.

You should also put plenty of water around each of the plants. Simply take the hose off the pipe while it is still running and water the plants. It doesn't hurt to thoroughly wet the entire top of the system with part of the water. Return the hose to the reservoir pipe and continue filling.

If you have experienced very wet conditions, and the system will probably not hold 100 gallons of water, mix the Super Juice™ in a five gallon bucket of water. Pour this mixture in the upright pipe, then add water until the system will hold no more.

SUMMARY, RAMIFICATIONS, AND SCOPE

Accordingly, the reader will see that the invention is inexpensive, since installation is only required one time; simple; and easy to maintain. A nearby water source, a container, such as a 55-gallon drum, and common garden hose are all that are needed for maintaining the system. Maintenance is only required three times per year normally and only takes approximately 15–20 minutes per system. Other advantages are:

This system, once installed, will last indefinitely.

This system uses natural food sources for the deer, such as honeysuckle, wild grape, green briars, berry briars, etc. Many studies at Auburn University have shown that deer prefer natural vegetation to planted food plots.

The high protein natural vegetation is sensed by the deer and will attract them to the system. They prefer natural vegetation to planted food plots or grains, therefore spending more time at the system once there.

This system will provide a high protein food source during the most crucial time, when the antlers are growing. It will provide spring-like growth all summer long when the bucks antlers are developing and the does are producing milk for newborn fawns.

This system "fixes" the soil problems by being irrigated under ground, which allows the soil to hold the water better than above ground irrigation. This also forces the roots of the plants to grow deeper into the soil, which gives them added protection during a severe hot, drought. It also adds organic material and lime to correct for acidity and increase the cation exchange capacity.

Although the description above contains many specificities, these should not be construed as limiting the scope of the invention but as merely providing examples of some of the presently recommended embodiments of this invention. For example, the system could be installed using a 10 feet long trench, instead of 20 feet, the PVC stand pipe used for servicing can be of a larger diameter PVC pipe than stated in the specifications, etc.

Thus the scope of the invention should be determined by the appended claims and their legal equivalents, rather than by the examples given.

I claim:

1. A system for growing vegetation comprising: A trench having a bottom formed within the ground; a layer of limestone applied over said trench bottom; a tubular percolated member extending along said trench and supported by said trench bottom over said limestone; a water absorbent upon said percolated member; paper sheeting applied over said absorbent and percolated member; soil filled about and over said percolated member upon said paper sheeting; additional limestone applied upon said soil; tree bark applied upon said additional limestone; a water soluble fertilizer, additional water absorbent, and a bacterial inoculant applied over said bark; additional soil applied upon said fertilizer, additional water absorbent, and inoculant; more limestone applied over said additional soil; additional tree bark applied over said additional soil and said more limestone thereon; additional water soluble fertilizer, more water absorbent, and additional bacterial inoculant applied over said additional tree bark; more soil applied over said additional tree bark and said additional water soluble fertilizer, and more water absorbent, and additional inoculant thereon; and further lime applied over said last mentioned soil; a conduit extending from said last mentioned soil downwardly to said tubular percolated member for admitting water into said system at said percolated member; said last mentioned soil for accommodating said vegetation.

2. The system of claim 1 wherein said water absorbent is a polymer.

3. The system of claim 1 wherein said water absorbent is a copolymer acrylamide acrylate.

4. The system of claim 1 wherein said tree bark is pine bark.

5. The system of claim 1 wherein said percolated member is a bundled polystyrene aggregate.

6. The system of claim 5 wherein said aggregate is styrofoam.

7. The system of claim 1 wherein said bacterial inoculant is a clover and alfalfa seed inoculant.

\* \* \* \* \*